(12) United States Patent
Bieschke et al.

(10) Patent No.: US 9,367,587 B2
(45) Date of Patent: Jun. 14, 2016

(54) SYSTEM AND METHOD FOR COMBINING INPUTS TO GENERATE AND MODIFY PLAYLISTS

(71) Applicants: Eric Kenson Bieschke, San Francisco, CA (US); Kyle George Lind, Lafayette, CA (US); Gordon Parker Rios, Fort Bragg, CA (US)

(72) Inventors: Eric Kenson Bieschke, San Francisco, CA (US); Kyle George Lind, Lafayette, CA (US); Gordon Parker Rios, Fort Bragg, CA (US)

(73) Assignee: Pandora Media, Oakland, CA (US)

( * ) Notice: Subject to any disclaimer, the term of this patent is extended or adjusted under 35 U.S.C. 154(b) by 529 days.

(21) Appl. No.: 13/647,993

(22) Filed: Oct. 9, 2012

(65) Prior Publication Data
US 2014/0074861 A1 Mar. 13, 2014

Related U.S. Application Data

(60) Provisional application No. 61/698,501, filed on Sep. 7, 2012.

(51) Int. Cl.
| | |
|---|---|
| *G06F 17/30* | (2006.01) |
| *H04N 21/258* | (2011.01) |
| *H04N 21/262* | (2011.01) |
| *H04N 21/442* | (2011.01) |

(Continued)

(52) U.S. Cl.
CPC ...... *G06F 17/3053* (2013.01); *G06F 17/30053* (2013.01); *G06F 17/30772* (2013.01); *H04N 21/25833* (2013.01); *H04N 21/25841* (2013.01); *H04N 21/25883* (2013.01); *H04N 21/25891* (2013.01); *H04N 21/26258* (2013.01); *H04N 21/44222* (2013.01); *H04N 21/4756* (2013.01); *H04N 21/6582* (2013.01); *H04N 21/8113* (2013.01)

(58) Field of Classification Search
CPC ................................................. G06F 17/30752
USPC ........................................................ 707/748
See application file for complete search history.

(56) References Cited

U.S. PATENT DOCUMENTS
| | | | |
|---|---|---|---|
| 7,003,515 B1 | 2/2006 | Glaser et al. | |
| 7,325,043 B1 * | 1/2008 | Rosenberg et al. | ........... 709/219 |

(Continued)

OTHER PUBLICATIONS

Pandora Media, International Search Report and Written Opinion dated Dec. 5, 2013, received in International Application No. PCT/US2013/058452, which corresponds to U.S. Appl. No. 13/647,993, 9 pages.

Adomavicius, et al., Toward the Next Generation of Recommender Systems: A Survey of the State-of-the-Art and Possible Extensions, IEEE Transactions on Knowledge and Data Engineering, vol. 17, No. 6, Jun. 2005, 16 pages.

Basiri, et al., Alleviating the Cold-Start Problem of Recommender Systems Using a New Hybrid Approach, 2010 5th International Symposium on Telecommunicaitons (IST'2010), 6 pages.

(Continued)

*Primary Examiner* — Kris Mackes
(74) *Attorney, Agent, or Firm* — Morgan, Lewis & Bockius LLP (57) ABSTRACT

Systems, methods, and computer readable storage mediums are provided for selecting a media content object for a user using a combination of inputs. A media input seed associated with a user is obtained. A plurality of channels of media content objects is obtained. At least one of the plurality of channels is associated with the media input seed. Also, in some embodiments, each media content object of each of those channels has a score specific to that channel. A combination score for a respective media content object is calculated based at least in part on that respective media content object's channel specific score for each of at least two of the plurality of channels. Then at least some of the media content objects are ranked based at least in part on their respective combination scores. Finally, at least one ranked media content object is then selected for transmission.

24 Claims, 8 Drawing Sheets

(51) Int. Cl.
*H04N 21/475* (2011.01)
*H04N 21/658* (2011.01)
*H04N 21/81* (2011.01)

(56) References Cited

U.S. PATENT DOCUMENTS

| | | | |
|---|---|---|---|
| 7,711,838 B1* | 5/2010 | Boulter et al. | 709/231 |
| 7,962,482 B2 | 6/2011 | Handman et al. | |
| 2005/0131731 A1* | 6/2005 | Brydon et al. | 705/1 |
| 2006/0212442 A1 | 9/2006 | Conrad et al. | |
| 2006/0212444 A1 | 9/2006 | Handman et al. | |
| 2006/0254409 A1* | 11/2006 | Withop | 84/601 |
| 2010/0325135 A1* | 12/2010 | Chen et al. | 707/759 |
| 2011/0213769 A1* | 9/2011 | Handman et al. | 707/722 |
| 2011/0252947 A1* | 10/2011 | Eggink et al. | 84/609 |
| 2012/0110179 A1* | 5/2012 | van Coppenolle et al. | 709/225 |
| 2012/0284282 A9* | 11/2012 | Ghosh et al. | 707/748 |

OTHER PUBLICATIONS

Kim, et al., A New Approach for Combining Content-Based and Collaborative Filters, J Intell Inf Syst (2006) 27: 79-91, 13 pages.

Lekakos, et al., A Hybrid Approach for Movie Recommendation, Multimed Tools Appl (2008) 36:55-70, 16 pages.

Pandora Media, International Search Report and Written Opinion dated Jul. 29, 2014, received in International Application No. PCT/US2014/027750, which corresponds to U.S. Appl. No. 13/835,040, 17 pages.

Pandora Media, International Preliminary Report on Patentability, PCT/US2013/058452, dated Mar. 10, 2015, 6 pages.

Pandora Media, Communication pursuant to Rules 161(i) and 162 EPC, EP 13773888.6, dated May 21, 2015, 2 pages.

* cited by examiner

Seed Related Channels 202

| Channel Name | Description |
|---|---|
| Highest Ranking 204 | Songs user has personally ranked highly (e.g. thumbed up) |
| Collaborative Filtering 206 | Crowd opinion based on user's thumbed up songs |
| Whitelist 208 | Songs for seed artist, and songs generally successful (liked by users) for a seed |
| Genre 214 | Songs in the same genre as the seed |
| Sounds Like (Mus. Genm) 216 | Songs with musicological similararities to a seed |
| ⋮ | ⋮ |
| Seed Related Channel "N" 217 | Songs related to seed via characteristic "N" |

| | |
|---|---|
| Song A 218 | Song A "Highest Ranking" Score 224 |
| Song B 220 | Song B "Highest Ranking" Score 226 |
| Song C 222 | Song B "Highest Ranking" Score 228 |
| ⋮ | ⋮ |

| | |
|---|---|
| Song A 230/218 | Song A "Genre" Score 236 |
| Song D 232 | Song D "Genre" Score 238 |
| Song E 234 | Song E "Genre" Score 240 |
| ⋮ | ⋮ |

Figure 2A

Generic Channels 242

| Channel Name | Description |
|---|---|
| Editor's Picks 244 | Test songs (e.g. "editor's favorites") |
| Current 246 | Currently popular (new songs) |
| Re-current 248 | Relatively new popular songs (e.g., songs popular within the last 2 years) |
| Gold 250 | Classic / always popular songs |
| New Release 254 | Newly released songs |
| ⋮ | ⋮ |
| Generic Related Channel "N" 255 | Songs selected based on generic characteristic "N" (i.e., not selected based on user seed or demographic information) |

| | |
|---|---|
| Song A 256/218 | Song A "Gold" Score 262 |
| Song E 258/234 | Song E "Gold" Score 264 |
| Song F 260 | Song F "Gold" Score 268 |
| ⋮ | ⋮ |

Figure 2B

Demographic Channels 270

| Channel Name | Description |
|---|---|
| Age 272 | Songs popular with user's age bracket |
| Gender 274 | Songs popular with user's gender |
| Location 276 | Songs popular in user's geographic location |
| Local Artist 278 | Songs by artists near the user's geographic location |
| ⋮ | ⋮ |
| Demographic Related Channel "N" 279 | Songs selected for based on demographic information for the user |

| | |
|---|---|
| Song A 280/218 | Song A "Gender" Score 292 |
| Song C 282/222 | Song C "Gender" Score 294 |
| Song F 290/260 | Song F "Gender" Score 296 |
| ⋮ | ⋮ |

SYSTEM AND METHOD FOR COMBINING INPUTS TO GENERATE AND MODIFY PLAYLISTS

RELATED APPLICATIONS

This application claims the priority of the following U.S. Provisional Patent Application which is incorporated by reference herein in its entirety: U.S. Provisional Patent Application No. 61/698,501, filed Sep. 7, 2012, entitled "System and Method for Combining Inputs to Generate and Modify Playlists."

TECHNICAL FIELD

The disclosed embodiments relate generally to systems and methods for combining inputs to generate and modify playlists and/or to select an individual media content object (such as a song) to transmit to a user.

BACKGROUND

People typically listen to digital music by manually selecting a song or album to listen to. Users may also create a playlist of songs from a variety of albums. Both of these methods, however, require the user to have a copy of the music to play. As users typically do not have an unlimited collection of music, their selection and playback of songs is limited. Some online services exist where users can either purchase individual songs or albums, or purchase a monthly subscription to a pool of music. These services, however, still require the user to manually identify songs for playback.

As it takes time and effort to select songs and albums or to create playlists, many users still choose to listen to broadcast radio stations where someone else manually selects the programming. For example, a commercial "lite rock" FM radio station may review "lite rock" songs, which are manually selected for playback. Such broadcast radio stations, however, cater to large groups of listeners, and, as such, are not customized for individual users.

Accordingly, users typically have to choose between a more individualized listening experience that requires manually identifying and selecting music for playback, or the less individualized listening experience of radio that does not require the user to select songs for playback.

SUMMARY

Given the above disadvantages, it would be advantageous to provide methods and systems for automatically generating playlists for a user from a large library of songs, where the generated playlist takes into account the user's preferences without limiting the user to songs he/she owns or has manually selected. Moreover, it would be advantageous to provide methods and systems for combining or mixing inputs, such as songs or playlists of songs, from a variety of sources to generate playlists for the user (or to select a media content object for transmission to the user). Alternatively or additionally, it would be advantageous to provide methods and systems for combining or mixing such inputs in real time from a variety of sources to select an individual media content object (such as a song) to transmit in response to a user's request. It would also be advantageous if the media content object selection or playlist generation took into account the user's feedback regarding musical interests, the users demographic information, and/or the current status of the user (such as the user's location, what device he/she is using, and what time it is). For example, a user may wish to listen to a different type of playlist on a portable music player while exercising at the gym than he/she wishes to listen to when at work.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a computer-implemented method of selecting a media content object for a user. The method is performed on a server system having one or more processors and memory storing one or more programs for execution by the one or more processors to perform the method. A media input seed associated with a user is received or obtained. A plurality of channels of media content objects is obtained. In some embodiments, at least one of the plurality of channels is associated with the media input seed. Also, in some embodiments, each media content object of each of those channels has a score specific to that channel. A combination score for a respective media content object is obtained or calculated based at least in part on that respective media content object's channel specific score for each of at least two of the plurality of channels. Then at least some of the media content objects are ranked based at least in part on their respective combination scores. At least one media content object is then selected for transmission based at least in part on the ranking.

Some embodiments provide a server system comprising one or more central processing units, CPU(s), for executing programs and also includes memory sorting the programs to be executed by the CPUs. The programs include instructions to perform any or all portions of the aforementioned method of selecting a media content object for a user.

Yet other embodiments provide a computer readable storage medium storing one or more programs configured for execution by a computer. The programs include instructions to perform any or all portions of the aforementioned method of selecting a media content object for a user.

These methods, systems, and computer readable storage mediums provide new, less cumbersome, more efficient ways to select a media content object for a user. Furthermore, these methods, systems, and computer readable storage mediums provide new, less cumbersome, more efficient ways to combining inputs from a variety of sources to generate and modify playlists for the user and/or to select a media content object for transmission to the user. Other details, features and advantages of embodiments of the invention will become apparent with reference to the following detailed description and figures.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, steps, operations, elements, components, and/or groups thereof.

As used herein, the term "if" may be construed to mean "when" or "upon" or "in response to," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1A:
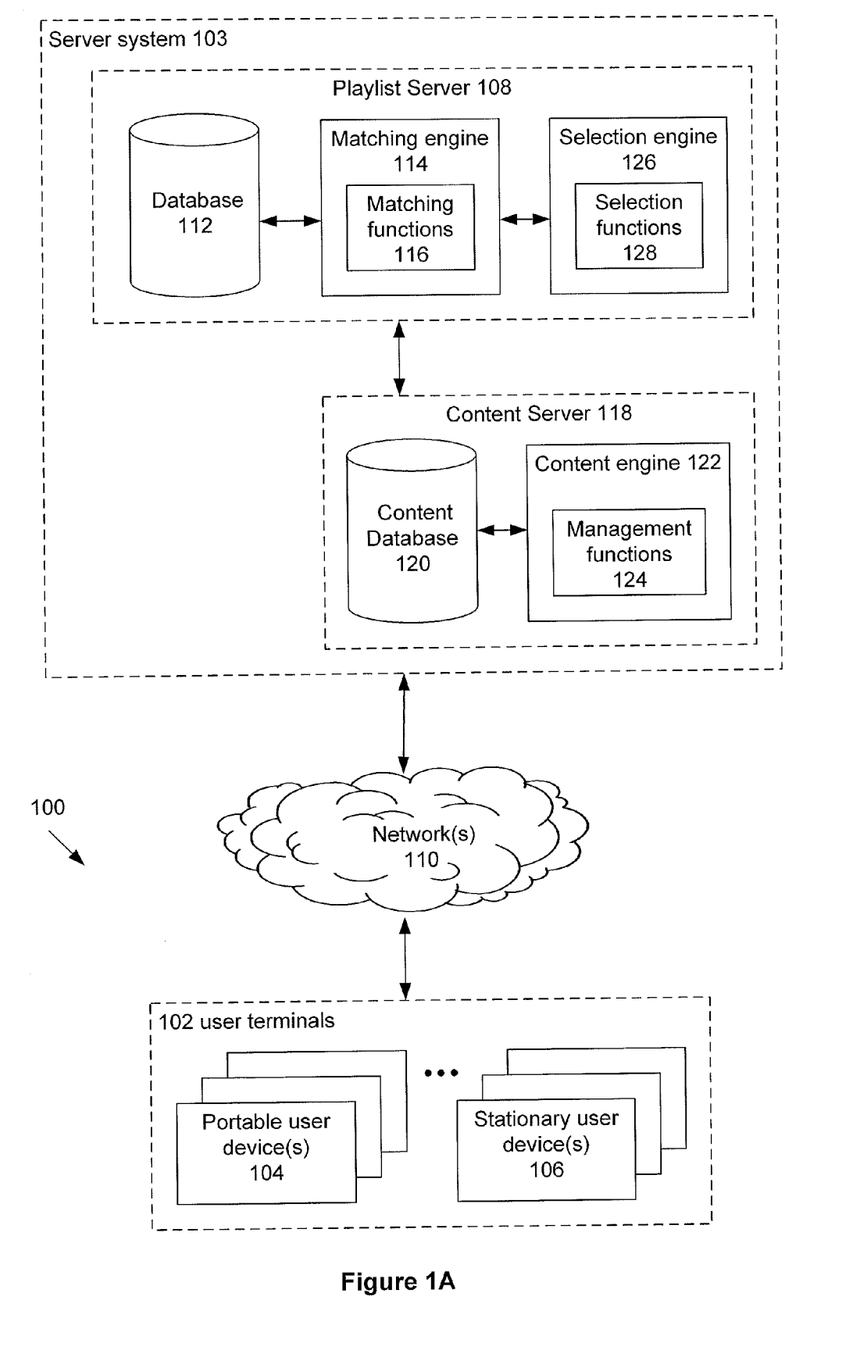
FIG. 1A is a block diagram illustrating an exemplary operating system, in accordance with some embodiments.

FIG. 1A is a block diagram illustrating an exemplary system 100 that may be used to implement embodiments of the invention. A plurality of user terminals 102 (e.g., one or more portable devices 104 such as a cell phones, portable music players, vehicle music players, tablets, laptops, etc) (and/or e.g., stationary devices 106 such as desk top computers, fixed media systems, personal or group networks, etc) are coupled via one or more communication networks 110 to a server system 103 including a playlist server 108 and content server 118. It is noted that a plurality of user terminals may be associated with one user's account. Furthermore, the server system 103 is capable of communicating with numerous users simultaneously. In some embodiments, the playlist server 108 and the content server 118 are components of a single server 103, which performs all functions of the playlist server 108 and the content server 118. The terminals 102, playlist server 108, and content server 118, each comprise one or more processing units (CPU's), one or more network or other communications interfaces, memory, and one or more communication buses for interconnecting these components to other conventional electronic components and may be programmed with processor-executable instructions to facilitate communication via network 110 and perform various aspects of the below describe embodiments.

In some embodiments, one or more of the user terminals 102 have a user interface comprising a display device, an input mechanism such as a keyboard or voice activated input mechanism, a media playing mechanism (such as a speaker or an audio-out jack), and optionally a GPS system. In some embodiments, the input mechanism of one of the terminals 102 is used to receive a new media input seed associated with a user.

In some embodiments, a media input seed is a song that the user selects to start an automatically generated user specific playlist or a station that plays songs related to the media input seed (e.g., the song) selected. In other embodiments, the media input seed is an artist's name, a genre, an album name, a composer name, a lyricist name, a director name, a movie title, a producer name, a TV station name, a DJ name; and the like.

In some embodiments, the one or more of the user terminals' 102 interfaces enables a user to interact with the server system 103. The user interfaces may allow a user to utilize a variety of functions, such as displaying information from the server system 103, requesting additional information from server system 103, customizing local and/or remote aspects of the system, and controlling local and/or remote aspects of the system as described in U.S. Pat. Pub. No. 2006/0212442, incorporated herein by reference. In some embodiments, user terminals 102 are operated in a client-server configuration to permit a user to retrieve web pages from the server system 103. Furthermore, any of various conventional web browsers can be used to display and manipulate data on the web pages. In yet other embodiments, TV equipment, audio equipment, DVD players, and the like are utilized as user terminals.

Memory used by any of terminals 102, playlist server 108, and content server 118 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory optionally includes one or more storage devices remotely located from the CPU(s). In some embodiments, memory, or alternately the non-volatile memory device(s) within memory, comprises a non-transitory computer readable storage medium (as explained in more detail for the playlist server 108 and content server 118 with respect to FIG. 1B.)

One skilled in the art will appreciate that the network 110 is not limited to a particular type of network. For example, the network 110 may feature one or more wide area networks (WANs), such as the Internet. The network 110 may also feature one or more local area networks (LANs) having one or more of the well-known LAN topologies and the use of a variety of different protocols on these topologies, such as Ethernet, TCP/IP, Frame Relay, Ethernet, FTP, HTTP and the like, is presumed. Moreover, the network 110 may feature a Public Switched Telephone Network (PSTN) featuring landline and cellular telephone terminals, or else a network featuring a combination of any or all of the above. The user terminals 102, (e.g., 104 and/or 106) may be coupled to network 110 via, for example, twisted pair wires, coaxial cable, fiber optics, electromagnetic waves or other media.

Figure 1B:
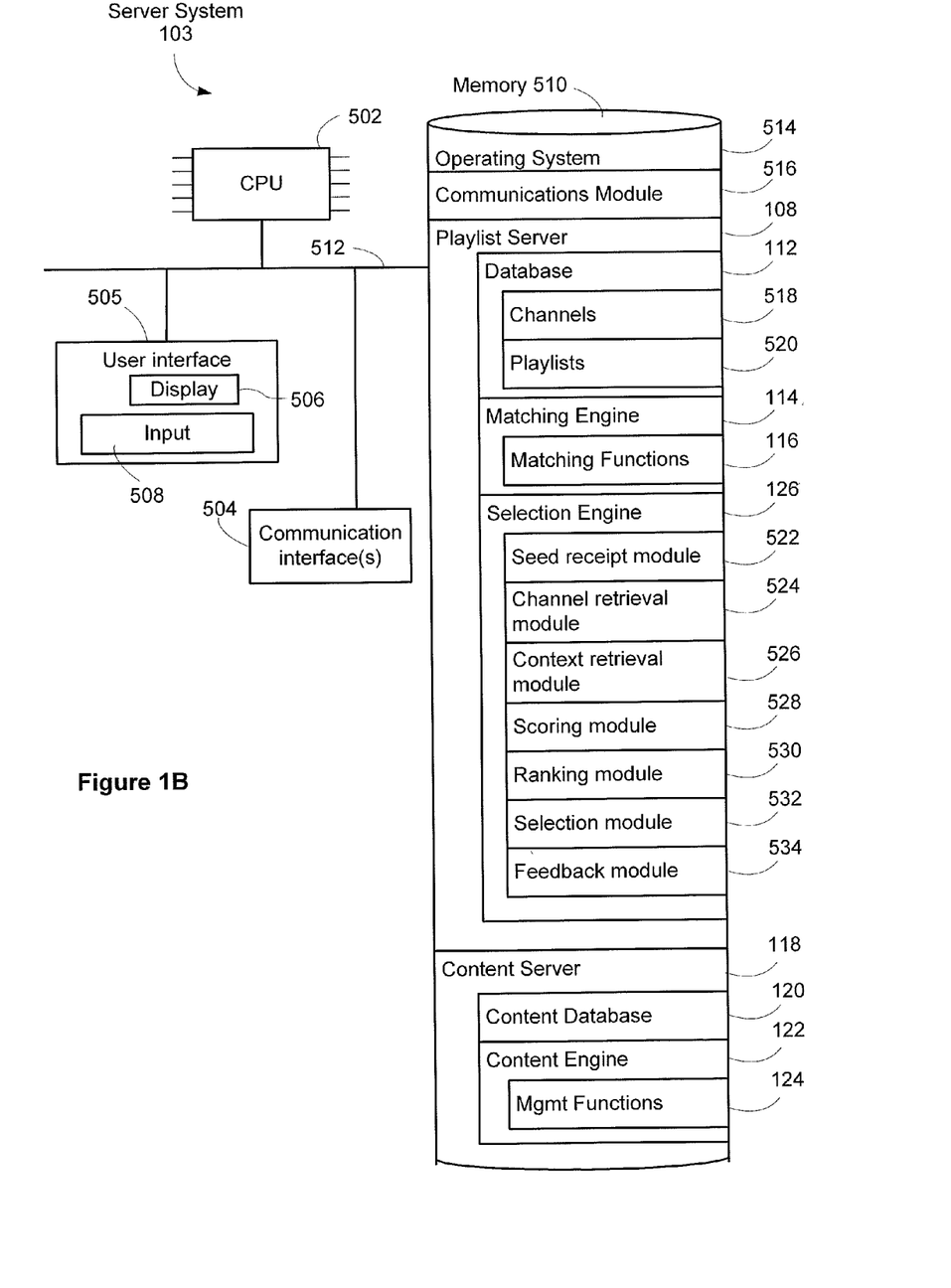
FIG. 1B is a block diagram illustrating an exemplary server system suitable for implementing some embodiments.
Figure 2A:
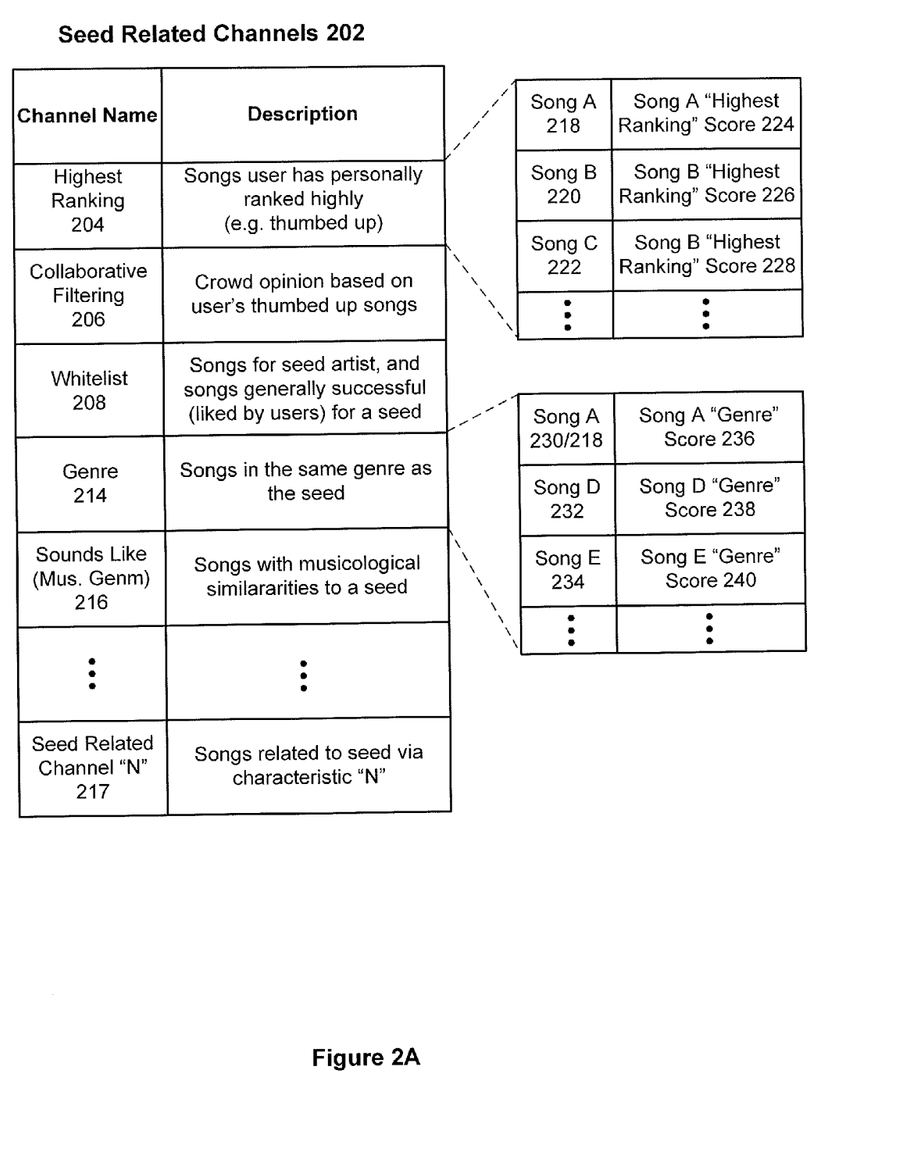
FIG. 2A is block diagram illustrating exemplary database/memory structure for seed related channels of media content objects, in accordance with some embodiments.
Figure 2B:
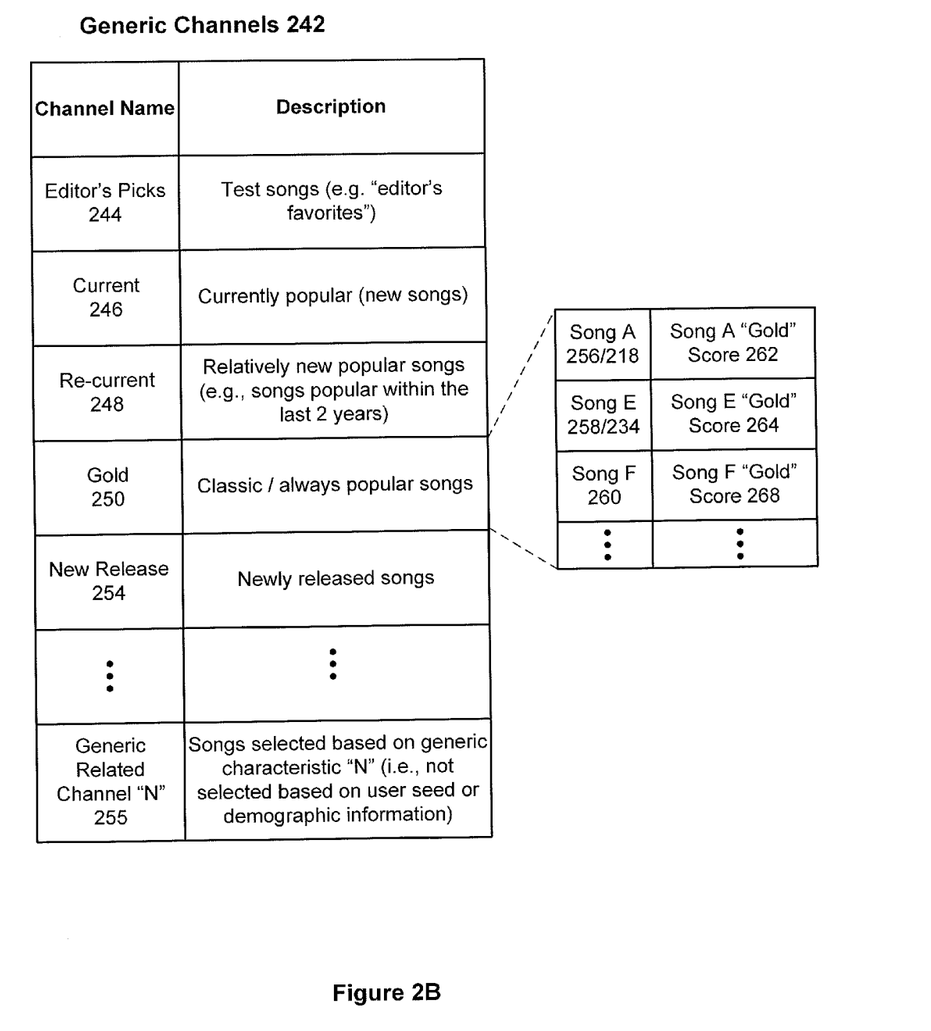
FIG. 2B is block diagram illustrating exemplary database/memory structure for generic channels of media content objects, in accordance with some embodiments.
Figure 2C:
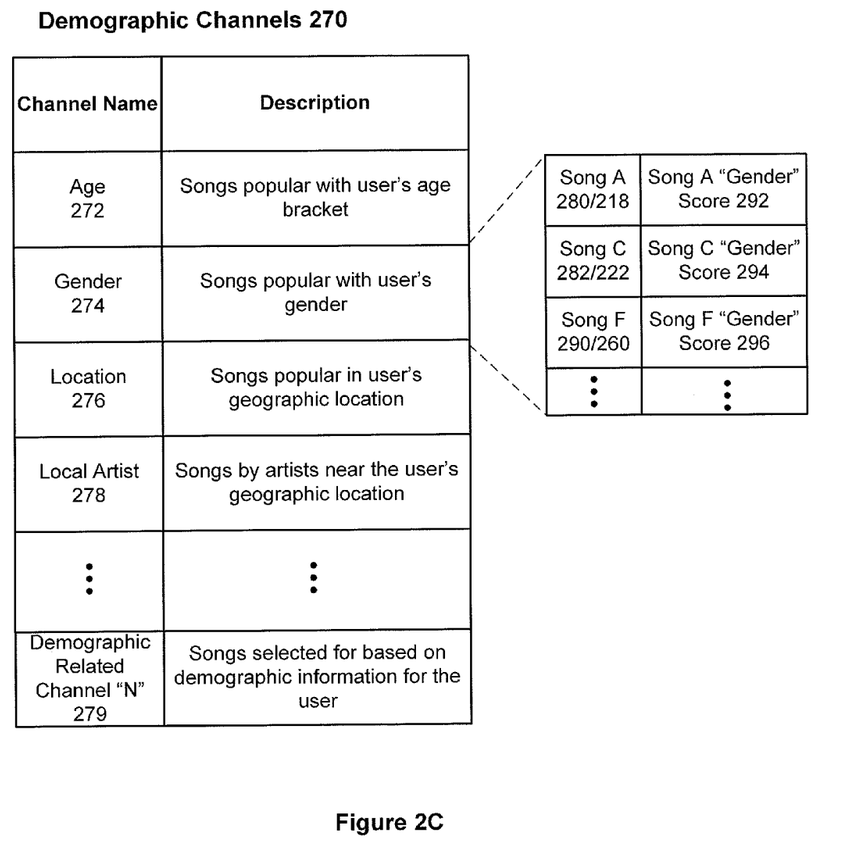
FIG. 2C is block diagram illustrating exemplary database/memory structure for demographic channels of media content objects, in accordance with some embodiments.

In some embodiments of the invention, playlist server 108 contains a database of items 112, including a plurality of channels, each containing a list of media content objects as illustrated and explained with respect to FIGS. 2A-2C. The playlist server 108 also stores playlists associated with one or more users, in some embodiments the playlists include combination scores associated with various media content objects on the playlist, as illustrated and explained with respect to FIGS. 4 and 1B. In some embodiments a media content object is a song, a piece of music, an audio recording, a video, a movie, a slide show, an image, or other types of media files. In some embodiments, the playlist server 108 does not contain the database of items 112, as illustrated here but is instead coupled to a separate database of items 112. For example, playlist server 108 may be coupled to a "MUSIC GENOME PROJECT" database as described in Applicant's U.S. Pat. No. 7,003,515 incorporated herein by reference in its entirety, as well as a variety of other databases containing channels of media content objects. In some embodiments, the playlist server 108 also contains or is coupled to a matching engine 114. The matching engine 114 utilizes an associated set of search and matching functions to operate on the database of items 112 as described in Applicant's U.S. Pat. No. 7,962,482, which is incorporate here by reference in its entirety. For example, in one embodiment the matching engine 114 is utilized with the "MUSIC GENOME PROJECT" database, and the matching engine 114 utilizes search and matching functions implemented in software or hardware to effectively calculate the distance between a source song and other songs in the database (as described in U.S. Pat. No. 7,003,515), and then sorts the results to yield an adjustable number of closest matches. In some embodiments, the playlist server 108 also contains or is coupled to a selection engine 126. The selection engine 126 is used to select a media content object, or a playlist of media content objects, for a user from a plurality of channels using various methods and weighing various factors 128. The selection functions 128 are described in detail with respect to FIG. 4, and are used by various modules described in detail with respect to FIG. 1B.

In some embodiments, the content server 118 contains a database of media content objects 120. In other embodiments, the content server 118 is wholly or partially integrated with playlist server 108. In some embodiments, the playlist server 108 does not contain the database of media content objects 120 but is separately coupled to the database of media content objects 120. The content server 118 may also contain or be coupled to a content engine 122. The content engine 122 utilizes an associated set of management functions 124, such as standard finding, packaging and sending functions, to operate on the database of content objects 122. In one embodiment of the invention, for example, content engine 122 utilizes management functions implemented in software or hardware to control the transmission of media content objects by, for example, streaming and/or downloading the media content objects to terminals 102.

Figure 4:
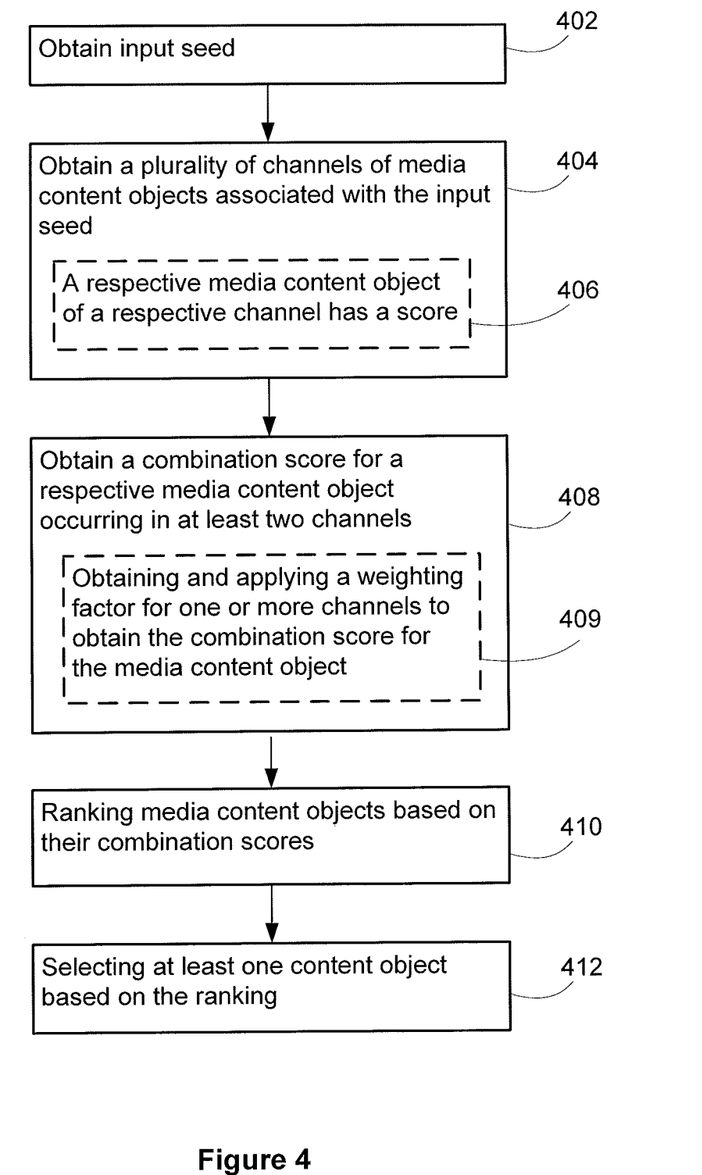
FIG. 4 is a flowchart representing an exemplary detailed method used to select a media content object (such as a song) based on an input seed using a combination of input channels, in accordance with some embodiments.

FIG. 1B is a block diagram illustrating an exemplary server system 103 suitable for implementing some embodiments. The server system 103 typically includes one or more processing units (CPU's) 502, one or more network or other communications interfaces 504, memory 510, and one or more communication buses 512 for interconnecting these components. The communication buses 512 optionally include circuitry (sometimes called a chipset) that interconnects and controls communications between system components. The server system 103 optionally includes a user interface 505 comprising a display device 506 and an input mechanism 508 (such as keyboard). Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 514 that includes procedures for handling various basic system services and for performing hardware dependent tasks;
- a network communication module 516 that is used for connecting the server system 103 to other computers via the one or more communication network interfaces 504 (wired or wireless) and one or more communication networks, such as the Internet, other wide area networks, local area networks, metropolitan area networks, and so on;
- a playlist server 108 which contains or is coupled to:
  - a database of items 112, including:
    - a plurality of channels 518, each containing a list of media content objects and their associated channel specific scores (as illustrated in FIGS. 2A-2C); and
    - a plurality of playlists 520, wherein in some embodiments the stored playlists include combination scores associated with various media content objects on the playlist obtained or calculated as described with respect to FIG. 4;
  - a matching engine 114 that utilizes an associated set of search and matching functions 116 to operate on the database of items 112 as described in U.S. Pat. No. 7,962,482 (incorporated herein by reference);
  - a selection engine 126 for selecting a media content object or a playlist of media content objects, for a user from a plurality of channels 518 in database 112, using various modules including:
    - a seed receipt and processing module 522 for obtaining or receiving a media input seed associated with a user and processing the seed;
    - a channel retrieval module 524 for obtaining a plurality of channels of media content objects, in some embodiments at least one of the channels is associated with the media input seed received or the channel selection is influenced by the media input seed, in some embodiments at least one channel is obtained by the seed receipt and processing module 522;

a contextual retrieval module 526 for (optionally) obtaining contextual information associated with the user's current context (e.g., time, location, user device, etc);

a scoring module 528 for calculating or obtaining a combination score for a respective media content object, the combination score being based at least in part on the respective media content object's various channel specific scores, and the calculating including, in some embodiments, obtaining and using various weighting factors for the plurality of channels (or objects within the channels);

a ranking module 530 for ranking at least some of the media content objects based at least in part on their respective combination scores;

a selection module 532 for selecting at least one media content object for transmission to the user, the selection being based at least in part on the ranking of the media content objects although various other factors are also considered as discussed with respect to FIG. 4; and a feedback module 534 for receiving user feedback regarding the selected and transmitted media content object, the feedback being either or both explicit and implicit, and also optionally including contextual information;

a content server 118 which is wholly or partially integrated with playlist server 108 and contains or is coupled to:

a database of media content objects 120, including the media files to be sent to the user for play (audio, audiovisual etc) and any content associated with the media content objects;

a content engine 122 which utilizes an associated set of management functions 124, such as standard finding, packaging and sending functions, to operate on the database of content objects 122 to control the transmission of media content objects by, for example, streaming and/or downloading to user terminals (FIG. 1, 102).

Each of the above identified elements is typically stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 stores a subset of the modules and data structures identified above. Furthermore, memory 510 may store additional modules and data structures not described above.

Although FIG. 1B shows a server system 103, FIG. 1B is intended more as functional description of various features present in a set of servers than as a structural schematic of the embodiments described herein. In practice, and as recognized by those of ordinary skill in the art, items shown separately could be combined and some items could be separated. For example, some items shown separately in FIG. 1B could be implemented on single servers and single items could be implemented by one or more servers. The actual number of servers used to implement the server system 103 and how features are allocated among them will vary from one implementation to another, and typically depend in part on the amount of data traffic that the system must handle during peak usage periods as well as during average usage periods.

FIGS. 2A-2C are block diagrams illustrating exemplary database/memory structures for various channels of media content objects, in accordance with some embodiments. FIG. 2A is block diagram illustrating exemplary database/memory structure for seed related channels of media content objects, which are channels that are influenced by a media input seed. FIG. 2B is block diagram illustrating exemplary database/memory structure for generic channels of media content objects, which are channels influenced by external factors (but are not influenced by a media input seed or demographic information). FIG. 2C is block diagram illustrating exemplary database/memory structure for demographic channels of media content objects, which are channels influenced by demographic information.

FIG. 2A provides examples of seed related channels 202 (individual exemplary seed related channels are illustrated are: Highest Ranking 204, Collaborative Filtering 206, Whitelist 208, Genre 214, Music Genome 216, and another Seed Related Channel 217). As explained above, a seed is typically a song originally selected by the user to start a new "station" of songs related to the seed. However, a seed need not be a song, but can be an artist, composer, genre, etc. as explained with reference to FIG. 4. A channel is a list of media content objects that are associated with one another. For example, the seed related channels 202 are each influenced by the original media input seed. For example, the highest ranking channel 204 includes a listing of media content objects (e.g., songs) that the user who provided the media input seed has personally thumbed up while listening to the seed related channel. By ranked highly, it is meant that the user has indicated that the media content object is explicitly liked or approved by the user (e.g., the user has clicked on a "thumbs up" icon while listening to that song). In this figure, song A 218, song B 220, and song C 222 are illustrated as being listed in the highest ranking channel 204. For example, the user may have enjoyed listening to "Yellow Submarine" by the Beatles, and given the song a thumbs-up, one or more stars, or another indication of approval. Each respective media content object (e.g., song A 218) of a respective channel (e.g., highest ranking channel 204) has a channel specific score (e.g., Song A "highest ranking" score 224). Similarly Song B 220, has score 226, while Song C 222, has score 228 on the "Highest Ranking" channel 204. It is noted that in some embodiments all songs on a particular channel have an equal score. Song D 232 has score 238 and Song E 234 has score 240 on the "Genre" channel 214. In most embodiments, a media content object (e.g., Song A 230/218) is included in numerous channels simultaneously, but the media content object has a separately calculated channel specific score for each channel's list that it is on (e.g. Song A's "genre" score 236 is separate and distinct from Song A's "highest ranking" score 224). In some embodiments, the information about the media content object's scores across various channels is stored together or correlated. This correlation is illustrated herein by "Song A" having reference number 218 as well as 230, in the "Genre" channel 214. In other embodiments, the media content objects and their scores are stored separately by channel and are not correlated.

FIG. 2B provides some examples of generic channels 242 ((individual exemplary generic related channels are illustrated are: Editor's Picks 244, Current 246, Re-Current 248, Gold 250, New Release 254, and Generic Related Channel N 255). The generic channels 242 are not influenced by the original media input seed. The generic channels are influenced by things other than the media input seed such as the "Current" channel 246 or the "New Release" channel 254. In FIG. 2B, song A 256/218, song E 258, and song F 260 are illustrated as being listed in the Gold channel 250 (classic/ always popular media content objects). Each respective media content object (e.g., song F 260) of a respective channel (e.g., Gold channel 250) has a channel specific score (e.g., Song F "Gold" score 268). Similarly Song A 256, has score 262, while Song E 234, has score 264 all on the "Gold" channel 250.

FIG. 2C provides examples of demographic channels 270 (individual exemplary demographic related channels are illustrated are: Age 272, Gender 274, Location 276, Local Artist 278, and Demographic Related Channel N 279). In some embodiments, the demographic channels 270 are not influenced by the original media input seed. In other embodiments, one or more of the demographic channels are influenced by the original media input seed as well as demographic information. The demographic channels 270 are based on various demographic information provided (or deduced) about the user and correlated to other users having similar demographic information. For example, a channel based in part on the user's demographic information, as illustrated in FIG. 2C, includes an age related channel 272, a gender related channel 274, and geographic location related channels (a Location channel 276 and a Local artist channel 278). In FIG. 2C, song A 280/218, song C 282/222, and song F 290/260 are illustrated as being listed in the Gender channel 274 (content popular with others of the same gender). Each respective media content object (e.g., song A 280) of a respective channel (e.g., Gender channel 274) has a channel specific score (e.g., Song A's "Gender" score 292). Similarly Song C 282, has score 294, while Song F 290, has score 296 all on the "Gender" channel 274.

In most embodiments, a media content object (e.g., Song A 280/218) appears on numerous channels simultaneously, but the media content object has a channel specific score for each channel's list that it is on (e.g. Song A's "gender" score 292 is separate from Song A's "highest ranking" score 224 of FIG. 2A). In some embodiments, the information about the media content object's scores across various channels is stored together or correlated. This correlation is illustrated herein by "Song A" having reference number 218 as well as 280, in the gender channel 274 (similarly "Song C" has reference number 222 as well as 282 and "Song F" has reference number 260 as well as reference number 290 in the gender channel). But, in other embodiments, the media content objects and their scores are stored separately by channel and are not correlated. Furthermore, in some embodiments, only channels are scored, and the songs themselves are not scored individually within a particular channel. In some implementations, all of the songs on one channel are given the same score for that channel, so, for example, in some implementations score 224, score 226, and score 228 are all equal to one another.

Figure 3:
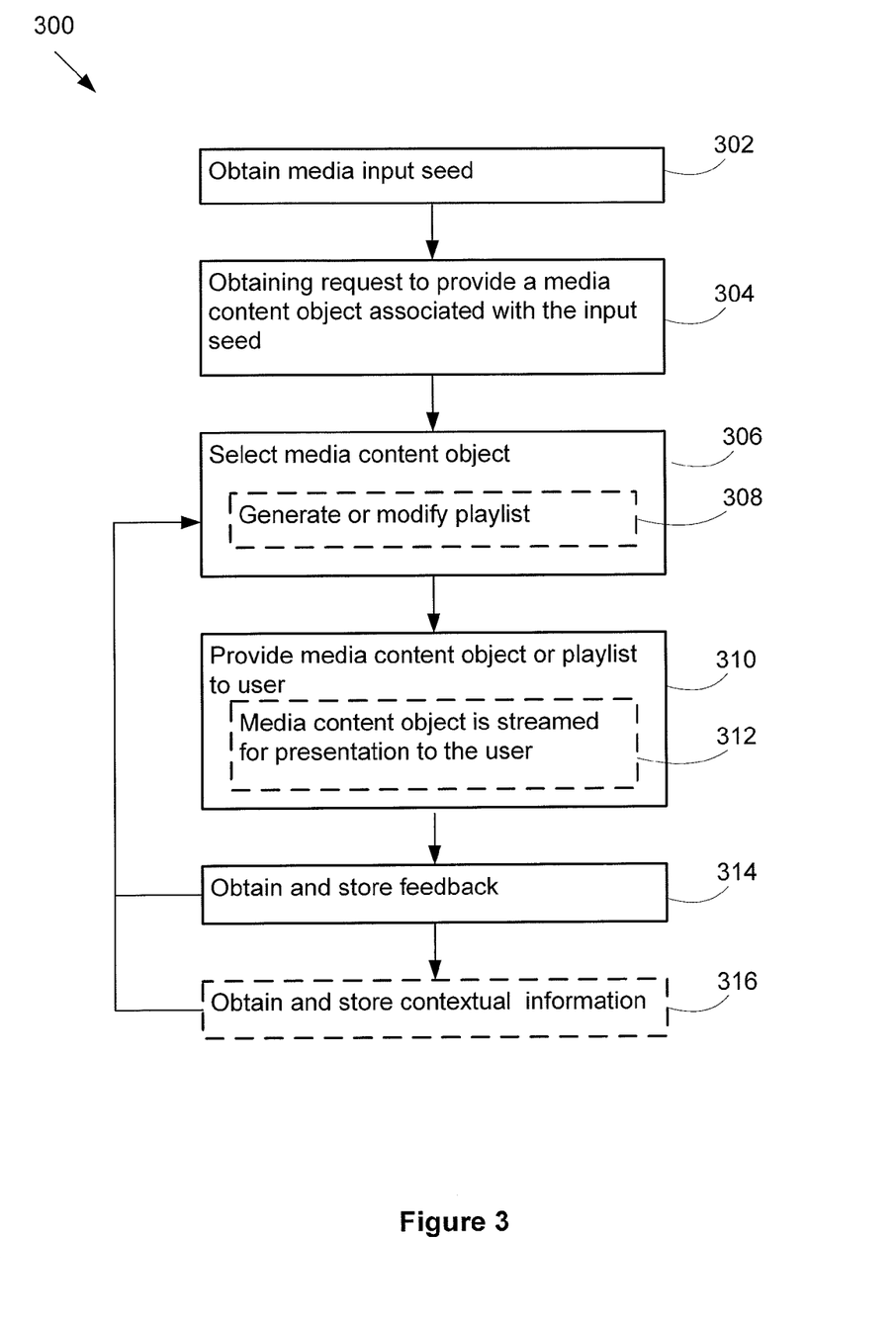
FIG. 3 is a flow chart representing an exemplary overview of a method used to select a media content object (such as a song) based on an input seed, provide it to the user, and obtain feedback, in accordance with some embodiments.

FIG. 3 is a flow chart representing an exemplary overview of a method (300) used to select a media content object (such as a song). The selection of the media content object is based at least in part on an input seed. In some embodiments, once selected, the media content object is transmitted/streamed to the user, and user feedback is received. The method (300) is executed by, for example, the system depicted in FIG. 1A. Method (300) is typically governed by instructions that are stored in a computer readable storage medium and that are executed by one or more processors of one or more servers system 103. Each of the operations that are shown in FIG. 3 typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are stored in source code, assembly language code, object code, or any other suitable instruction format that can be interpreted by one or more processors. Specifically, many of the operations shown in FIG. 3 correspond to instructions in various modules of the playlist server 108 and/or content server 118 of the server system 103 shown in FIG. 2A.

The server system 103 (FIG. 1A) obtains an input seed (302) from the user. In some embodiments, the user can select an input seed. In some embodiments, the user may also provide information for a user account such as name, password, contact information, demographic information, and preferences (e.g., musical preferences.) In other embodiments, the system obtains an input seed previously selected by the user. As explained above, the input seed may be a song name (such as "Paint It Black" or even a group of songs such as "Paint It Black" and "Ruby Tuesday"); an artist's name (such "Billy Joel" or the "Rolling Stones"); a genre (such as "Classic Rock" or era information such as "1960s"); an album name, a composer name, a lyricist name, a director name; a movie title; a producer name; a TV station name; a DJ name; etc. In one embodiment, the input seed is sent to the server system 103 (FIG. 1A) in order to perform a subsequent selection or of a media content object and/or generation of a playlist of one or more media content objects. In some embodiments, encryption and other security methods are used to protect communications between playlist server 108, content server 118 and/or user terminals 102.

The server system receives or obtains a request from the user to provide a media content object associated with the input seed (304). In some embodiments, the user is enabled to make the request via a user terminal's 102 input mechanism. This is a user explicit request. In other embodiments, a client device (e.g., 106 or 104) which is remotely located from the server system, automatically (i.e., without human intervention) provides the request in response to a triggering event, such as when a previously provided media content object (e.g., a song) has ended, or is about to end. This is a user implicit request. In some embodiments, the server system 103 automatically obtains a media content object in response to the triggering events discussed above. In still other embodiments, the server system 103 obtains media content objects and/or pre-processes playlist generation periodically as is explained in more detail below. In some embodiments, in response to the request, the steps of (306) and (310) discussed below are performed in real time such that the media content object is provided to the user in response to the user's explicit request or implicit request. For example, in some embodiments the media content object is provided in under the length of time to play a song (e.g., the media content object is provided prior to the previously playing song finishing). In some embodiments, the media content object is provided in under 5 minutes, or more preferably in under 2 minutes. In other embodiments, the media content object is provided in even shorter periods of time, for example, it is provided in under 10 sec, or more preferably in under 5 seconds, or more preferably in under 2 seconds, or more preferably in under 0.5 seconds. In some embodiments, the selected media content object is streamed to the client, as will be explained in more detail below. In other embodiments, all or portions of steps (306) and (310) discussed below are performed periodically, for example, each night. As such, some of the processing load is handled during non-peak hours. In these embodiments, responding to the request is efficiently accomplished in real time (e.g., in under 10 sec, or more preferably in under 5 seconds, or more preferably in under 2 seconds, or more preferably in under 0.5 seconds) by relying on pre processing the playlist generation.

In some embodiments, along with the request to provide media content, the server system receives or obtains contextual information such as which device a user is using or where the user's device is currently located. It is noted that location information may be available from GPS information obtained from the client device, especially if the device is portable. The location information may also be calculated based on cell phone towers used, or wifi location information. Locations for stationary devices may be obtained in the same way or may be received through explicit input by the user and stored in an account. In some embodiments, the server system obtains contextual information (from the client or otherwise) such as the time of day of the request and the date of the request. Various additional contextual information may also be received or obtained, as described with respect to step (316) below. In addition to contextual information, in some embodiments a user's account also includes demographic information such as age, sex, postal address, marital status, occupation, etc (e.g., any information provided in 302).

At least one media content object is a automatically selected (306) (i.e., without human intervention) selected (306) by the server system 103. The details regarding this selection are described in relation to FIG. 4. In some embodiments, a playlist of media content objects is generated (308). A playlist may, for example, be a sequence or list of songs (or other media content) for the user who provided the media input seed stored in database 112 of the playlist server 108. In some embodiments, a playlist is generated as a result of a comparison between the input seed and a plurality of channels of media content objects, as described in relation to FIG. 4. When a playlist is generated (or modified), the selection (306) is performed as follows. In some embodiments, individual media content objects (e.g., songs) are chosen for the playlist. In some embodiments, the media content objects are selected randomly from the playlist for a particular media input seed randomly. For example, 1 of 20 songs is randomly chosen from the playlist. In one embodiment, the first time the user listens to a station for the media input seed (or each time the user returns to that station) a song by the same artist as the input seed is selected, before any other songs are chosen from the playlist. As an alternative to, or in addition to, randomly selecting songs from the playlist, in some embodiments, rules are implemented to govern the selections. For example, aesthetic criteria are used in some implementations to prevent the same artist's songs from being played back-to-back, or prevent a song's repetition within a certain time period, e.g., 4 hours.

Moreover, regulatory criteria may be established to comply with, for example, copyright license agreements (e.g., to prevent the same artist's songs from being played more than 4 times in 3 hours). To implement such criteria, a history of songs that have been played may be stored (e.g., in at the playlist server's database 112) along with the time such songs were played.

Accordingly, in some embodiments, media content objects (e.g., songs) are selected for the playlist from one or more playlist sets according to random selection, aesthetic criteria and/or regulatory criteria. In some embodiments, to discern the actual order of songs in the playlist, focus traits of the media content objects are ranked (e.g., start with all selected songs from the playlist set deriving from the "male lead vocal" focus trait and then move to the next focus trait (details regarding focus trait analysis can be found in U.S. Pat. Pub. No. 2006/0212442 which is incorporated here by reference). Alternatively, or in addition, in some embodiments, the user's preferences to emphasize or de-emphasize particular playlist sets are taken into account. If, for example, a user decides that he/she does not like songs having the focus trait of "male lead vocal," songs in that playlist set can be limited in the playlist as explained in U.S. Pat. Pub. No. 2006/0212442.

At least one selected media content object is then provided to a user (310). For example, the selection engine 126 may send an identifier of the selected media content object received from the playlist server 108 to the content server 118. In response, the content server 118 may provide the media content object corresponding to the identifier to the player on the terminal 102.

In some embodiments, the identifiers correspond to, for example, song names (or other identifiers for uniquely identifying a media content object). The identifiers may be index fields or other handles for content database 120 on content server 118.

The content server 118 may provide a content object to the user in several ways. For example, content server 118 may stream a media content object to the user through well-known streaming techniques and protocols such as User Datagram Protocol (UDP), Real Time Transport Protocol (RTP), Real Time Streaming Protocol (RTSP), Real Time Control Protocol (RTCP) and Transmission Control Protocol (TCP) (312). As another example, content server 118 may provide a media content object to the user by downloading the object to the user's terminal 102. Thus, the content object is fully downloaded to the terminal 102 before it is played to the user. As yet another example, the media content object may be provided to the user through a hybrid of streaming and downloading, e.g., progressing download or the lists. In some embodiments, the content server 118 may provide the media content objects at a rate of 10 to 20 times that of the playback rate. In some embodiments, portions of the media content object that have not been played are cached in memory on terminal 102, while portions that have been played are deleted.

In some embodiments, the user provides feedback regarding the media content object (314). And the server system receives and stores the user feedback for the particular media content object. In some embodiments, the feedback is explicit (e.g., user selective) while in other embodiments it is implied based on user behavior. For example, in some embodiments, the feedback is whether or not the user turned off the player on his/her user terminal 102. In other embodiments, it is whether or not the user is a repeat customer, i.e., whether the user provided the media content seed in an earlier session. In some embodiments, the user optionally explicitly provides feedback such as by selecting a "thumbs up" or "thumbs down" (or other indication of liking or disliking) can for a particular media content object. The feedback provided by the user is sent to playlist server 108. The feedback is used to update information known about the user in order to provide media content objects more suited to the user in the future. In some embodiments, the user feedback is used to adjust at least one channel specific score for that media content object. As such, the future selection of the media content object is influenced by the new score for the media content object on at least one channel.

If the feedback about a content object is negative, then in some embodiments, the current playlist is modified immediately. For example, if the user chooses to "skip" a song, another song from the playlist is immediately selected and provided. Furthermore, the skipped song is scored lower for that user, on at least the channel being listed to. For example, the user may selectively (or implicitly) provide feedback that is negative about a song with a focus trait of "male lead vocal." In response, when a new media content object is selected or a new playlist is generated by playlist server 108 (or the existing playlist is modified) the selection/generation/modification accounts for the negative feedback. In some embodiments, a weighting value or scaling function corresponding to the focus trait of "male lead vocal" may be adjusted such that songs having strong focus traits of "male lead vocal" are less likely to match with the input seed originally provided by the user. In other embodiments, the particular media content object's channel specific score is lowered on at least one channel.

As another example, the user may selectively provide feedback that he or she does not like a particular type, genre or category of music, e.g., "jazz" music (or a general rule regarding a particular type of, genre or category of music is deduced from repeat user behavior.) In some embodiments, "Jazz" is a characteristic stored with regard to various songs in database 112. A weighting value is then assigned to the characteristic "jazz," which means that a match between the input seed and "jazz" songs is unlikely to result from a comparison of the input seed and database items.

In some embodiments, each time a media content object is presented to the user, feedback from the user (e.g., positive, negative, neutral) is stored along with the context (i.e., contextual information) in which the content object was presented (316). Examples of contextual information include, but are not limited to, the station on which the current song is playing, the song played immediately prior to the current song, the artist of the song playing immediately prior to the current song, one or more musicological characteristics of the prior song(s), the artist of the current song, the album containing the current song, time of day, day of week, calendar day (i.e., date), location of user (e.g., work, home, car, zip code, country, etc.), and user demographics (e.g., age, gender). Some contextual information may be related to the current song in the context of extrinsic factors, such as location of user (i.e., geography), user demographics, and/or time period (e.g., time of day, day of week, calendar date). Meanwhile, some contextual information may be related to the current song in the context of at least one of the following: particular artist, particular album, and/or particular station. In addition, some contextual information may be related to the current song in the context of a second content object (e.g., an immediately prior song). Moreover, some contextual information may be related to the current song in the context of characteristics of a second content object (e.g., characteristics of an immediately prior song such as treble, bass, vocals, etc.). Various other types of contextual information will be clear to one of skill in the art after thorough review of the entirety of the disclosure.

In some embodiments, when a user provides feedback about a media content object (e.g., "With or Without You" by U2), contextual information relating to that feedback is automatically obtained and stored in memory. For example, the particular station (e.g., "Pet Shop Boys" Station) the user was listening to when the "With or Without You" song played, the particular artist (e.g., "Pet Shop Boys") the user had provided as an input seed, and the time of day (e.g., 9 a.m.) and day of week (e.g., Monday) when the "With or Without You" song played may be automatically obtained and stored in memory as contextual information relating to the feedback. In another example, the fact that the user giving feedback was a 28-year old male located in California may be stored as contextual information relating to the feedback.

In some embodiments, the selection of the media content object (306) or generation/modification of a playlist (308) takes into account the user's feedback and/or user's contextual information associated with the feedback. For example, in some embodiments the user's feedback and/or user's contextual information is used to modify a playlist as described in U.S. Pat. No. 7,962,482 (incorporated herein by reference). In other embodiments, the user's feedback and/or user's contextual information affects a media content object's channel specific score on one or more channels, which are then used to select a media content object as described with respect to FIG. 4 below.

FIG. 4 is a flowchart representing an exemplary detailed method used to select a media content object (e.g., a song) based on an input seed using a combination of input channels, in accordance with some embodiments. This detailed method is a portion of the exemplary overview method (300) described with reference to FIG. 3. The method (400) is executed by, for example, the system depicted in FIG. 1A. Each of the operations shown in FIG. 4 typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically, many of the operations shown in FIG. 4 correspond to instructions in various modules of the selection engine 126 of the server system 103 shown in FIG. 1B.

The server system 103 obtains an input seed (402). In some embodiments, the server system obtains the media input seed as described with respect to FIG. 3 (302). In some embodiments, the user can select or input an input seed, which the system receives from the user in real time. For example, the user types the title of a song. In other embodiments, the system obtains the input seed previously supplied by the user. In some embodiments, the server system receives or obtains a request to provide a media content object associated with the input seed (FIG. 3, 304) and obtains a media input seed in response to the request. Next, at least one media content object is selected as described below.

The server system obtains a plurality of channels of media content objects (404). In some embodiments, the plurality of channels is obtained from database 112 (FIG. 1A), which contains a plurality of channels with lists of media content objects. In some embodiments all the channels in the database 112 are obtained, while in other embodiments a subset of the channels is obtained. Exemplary channels are shown in FIGS. 2A-2C. In some embodiments, at least one of the obtained plurality of channels is associated with the media input seed. In some embodiments, the selection of channels is influenced by the media input seed. For example, the media input seed is on one or more (or even all) of the selected channels. In some embodiments, the channels selected have a high (e.g., higher than average) channel specific score for the media input seed. In some embodiments, at least one channel is a seed related channel. For example, FIG. 2A, provides an exemplary listing of seed related channels, these seed related channels are influenced by the media input seed. In some embodiments, at least one of the obtained plurality of channels is not associated with the media input seed. For example, the media input seed does not exist on the channel. Or for example, a least one channel is generic. FIG. 2B, provides an exemplary listing of generic channels, these generic channels are influenced by things other than the media input seed, such as "Currently Popular" channel or the "New Release" channel. In some embodiments, at least one of the obtained plurality of channels is based in part on the user's demographic information. For example, FIG. 2C, provides an exemplary listing of demographic channels, these demographic channels are determined based on various information provided (or deduced) about the user. For example a channel based in part on the user's demographic information may include one or more of an age related channel, a gender related channel, and a geographic location related channel (e.g., songs popular in the user's geographic location, or songs by artists near the user's geographic location). In some embodiments, at least one channel is generic with respect to the media input seed and the user's demographic information.

As shown in FIGS. 2A-2C, each respective media content object (e.g., a song) of a respective channel has a channel specific score (406). In most embodiments, a media content object appears on numerous channels simultaneously. In some embodiments, a popular or well known media content object appears on every channel. In other embodiments, one or more media content objects are new or unusual enough to appear on only a few (or even one) channel. A media content object has a channel specific score for each channel list that it is on.

Next, the channels are mixed. A combination score is obtained for a respective media content object (408). In some embodiments, the combination score is calculated by combining the respective media content object's channel specific score for each of at least two of the plurality of channels. It is noted that in some implementations channels are scored such that a media content object's channel specific score on a first channel is the first channel's score. In some implementations, the combination score is calculated in real time or the fly in response to a request for a media content object. In other implementations the combination score is pre-calculated (e.g., it is calculated overnight or during other non-peak usage times.) In some embodiments, when the combination scores is pre-calculated, the weighting is performed in real time or on the fly in response to a media content object request. In some embodiments, the combination score is based at least in part on the respective media content object's channel specific score for two channels that it is on (e.g., it is a weighted summation). In some embodiments, the combination score is based at least in part on the respective media content object's channel specific score for three to five channels that it is on (i.e., three to five channels are mixed). In other embodiments, the combination score is a combination of each channel that the respective media content object is on. In still other embodiments, the combination score is based at least in part on the respective media content object's channel specific score for all or at least a majority of the obtained plurality of channels (i.e., the channels obtained in 404). In some embodiments, if the object is not listed on one or more of the obtained plurality of channels, that channel is ignored for the purposes of obtaining the respective media content object's combination score. In other embodiments, the media content object is given a default score on any channel where it is not listed.

In some embodiments, a weighting factor is obtained for each of the plurality of channels, and the combination score is obtained by applying a respective weighting factor to the respective media content object's channel specific score (409). In some embodiments, the weighting factor is based on user feedback of one or more users. In some embodiments, a weighting factor is the same for all songs on a particular channel, while in other embodiments each song on a channel has a distinct weighting factor. For example, in some embodiments the Highest Ranking channel may have a single high weighting factor because it includes songs the user has explicitly indicated that she/he likes, while in other embodiment, individual songs that the user has "thumbed up" more than once are weighted higher than those she/he has only "thumbed up" once. In some embodiments, the weighting factor is obtained by calculating it in response to receiving a request to provide a media content object associated with a media input seed, while in other embodiments the weighting factor is pre-calculated.

When contextual information is associated with the request, in some embodiments the obtained or calculated weighting factor is based in part on this context information. For example, if the user is currently located at a stationary device at work at the time of the request, he has different preferences associated with that context than he does when he requests a media content object from a portable device while at the gym. Thus, the weighting factors for each of a plurality of channels are calculated to include the user's contextual preferences. In some embodiments, the contextual information used includes, but is not limited to, one or more of the following: type of device associated with the request, location of the device associated with the request, time of day of the request, and date of the request. Type and location examples were described above. Time of day may affect what the user prefers, for example, the user may like to listen to calm music in the evening and peppy music in the morning, even when the location (e.g., home) and the device (e.g., portable MP3 player) are the same constant. Similarly, the date of the request may affect the user's preferences, because for example the user may wish to listen to Christmas related music in December, or love songs near Valentine's Day.

At least some of the media content objects are then ranked based at least in part on their respective combination scores (410). In some embodiments, the ranked media content objects are those media content objects associated with at least one of the obtained plurality of channels. It should be noted that not all ranked media content objects need to be associated with the media input seed. However, it is also noted that since at least one channel of media content objects which was obtained was associated with the media input seed, at least one ranked media content object will be associated with the media input seed. Thus, in most embodiments the ranked media content objects will include objects associated with the media input seed as well as media content objects not associated with the media input seed. As such, the ranked media content objects will likely include some media content objects known and probably liked by the user as well as some media content objects which are unknown to the user but which have been calculated to be probably liked by the user.

Next, at least one media content object is selected for the user (412). In some embodiments, the selection occurs in real time before a new media content object is streamed or played. The selection is based at least in part on the ranking. However, it is noted that the selection is not necessarily the top ranked media content object. As stated above, the ranked media content objects will likely contain media content objects both known and unknown to the user. This allows the server system to select and thus expose the user to media content objects which he/she may not know, but may like.

As explained with respect to FIG. 3, in some embodiments the media content object is then provided/transmitted to the user (310). Furthermore, in some embodiments a playlist of media content objects is generated or modified (including the selected media content object), and the playlist or a portion of it is provided to the user (308 and 310). In some embodiments, the playlist includes the ranked media content objects. In fact, in some embodiments, all of the media content objects on the playlist were ranked media content objects.

In other words, in some embodiments the selecting (412) comprises generating a playlist of media content objects based at least in part on their ranking and selecting at least one media content object for transmission from the playlist. In some implementations, the selection from the playlist is performed randomly. In other implementations, the highest ranked media content object is selected. In some implementations, additional factors are used in the selection. In some embodiments, the media content object selected may be one not been recently provided (e.g., not within in the last 2 hours, 12 hours, 24 hours, or the last week). In some implementations, the media content object selected may be one that is not by the same artist as the previously provided media content object.

Furthermore, in some embodiments, generating the playlist comprises determining from the plurality of channels two or more preferred channels, determining a minimum percentage of media content objects to be obtained from each preferred channel, and then generating a playlist of media content objects from the preferred channels in accordance with their respective minimum percentages.

Similarly, in some embodiments, the generated playlist also includes a minimum percentage of media content objects to be obtained from a respective media content channel that is determine at least in part based on the context information. In some embodiments, a request to provide a media content object associated with the media input seed is received and contextual information associated with the request is also obtained. Then the playlist is generated to include at least a minimum percentage of media content objects to be obtained from a respective media content channel which determine at least in part based on the context information. For example, when the user requests a media content object at 10 a.m. over a web interface at work, the playlist is generated to include an even mixture of media content items from the highest ranking channel, the genre channel, and the gold channel, whereas when the user requests a media content object at 6 p.m. from his mobile phone while driving, at least 80% of the playlist comes from the gold channel. In some embodiments, the generated playlist and the combination scores for each content media object on the playlist is also stored in database 112.

Figure 5:
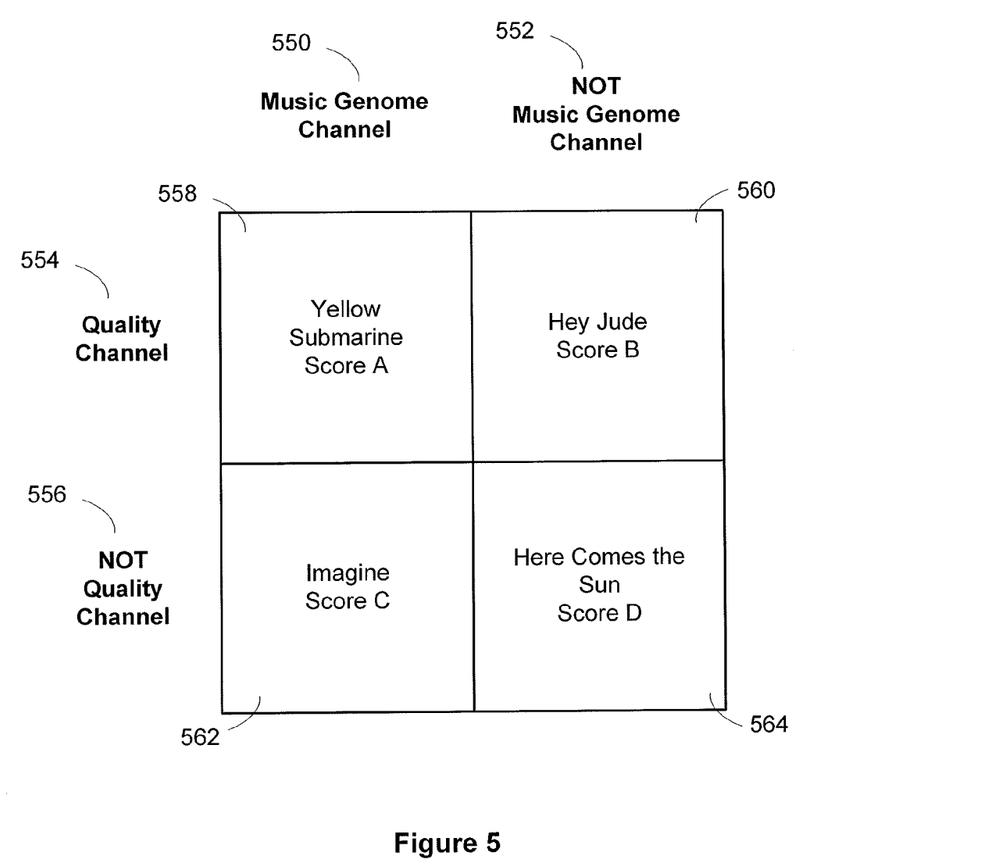
FIG. 5 is an exemplary channel matrix utilized for channel mixing, in accordance with some embodiments.

FIG. 5 is an exemplary channel matrix utilized for channel mixing, in accordance with some embodiments. When channels are crossed or mixed, the result can indicate whether a particular song was recommended by neither channel, by both channels, or just by one channel. FIG. 5 illustrates an example of crossing the Music Genome channel with the Quality Channel. In this example, "Yellow Submarine" 558 has Score A (e.g., 70%) when Music Genome Channel 550 is crossed with Quality Channel 554. "Hey Jude" 560 has Score B (e.g., 20%) when Not Music Genome Channel 552 is crossed with Quality Channel 554. "Imagine" 562 has Score C (e.g., −80%) when Not Quality Channel 556 is crossed with Music Genome Channel 550. "Here Comes the Sun" 564 has Score D (e.g., −90%) when Not Quality Channel 556 is mixed with Not Music Genome Channel 552. In this exemplary matrix two channels are mixed. When mixing more than two channels a multi-dimensional matrix is employed with scores computed by crossing each channel in the matrix.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of selecting a media content object, performed on a server system having one or more processors and memory storing one or more programs for execution by the one or more processors to perform the method, comprising:
   receiving a media input seed associated with a user;
   obtaining a plurality of channels of media content objects, wherein at least one of the plurality of channels is associated with the media input seed, at least one of the plurality of channels is not associated with the media input seed, and each respective media content object of a respective channel has a channel specific score;
   calculating a combination score for a respective media content object based at least in part on the respective media content object's channel specific score for each of at least three of the plurality of channels, wherein the combination score for the respective media content object includes a weighted sum of the respective media content object's channel specific score for each of at least the three of the plurality of channels;
   ranking at least some of the media content objects based at least in part on their respective combination scores; and
   selecting at least one media content object for transmission based at least in part on the ranking.

2. The method of claim 1, further comprising:
   receiving a request to provide a media content object associated with the media input seed to a client located remote from the server system;
   in response to receiving the request, performing the calculating, ranking, and selecting steps; and
   transmitting the selected media content object to the client.

3. The method of claim 2, wherein in response to receiving the request, performing the calculating, ranking, selecting, and transmitting steps are performed in under 5 minutes.

4. The method of claim 1, further comprising:
   receiving user feedback for the selected media content object; and
   adjusting at least one channel specific score based on the user feedback.

5. The method of claim 1, further comprising,
   obtaining a weighting factor for each of the plurality of channels; and
   wherein obtaining the combination score, additionally includes applying a respective weighting factor to the respective media content object's channel specific score.

6. The method of claim 5, further comprising:
   receiving a request to provide a media content object associated with the media input seed;
   obtaining contextual information associated with the request; and
   wherein the obtained weighting factor is based in part on the context information.

7. The method of claim 6, wherein the contextual information includes one or more of: type of device associated with the request, location of the device associated with the request, time of day of the request, day of the week, date of the request.

8. The method of claim 5, further comprising:
   receiving user feedback for the selected media content object; and wherein the obtained weighting factor is based in part on the user feedback.

9. The method of claim 1, wherein at least one of the plurality of channels is not associated with the media input seed.

10. The method of claim 1, wherein at least one channel is based in part on the user's demographic information.

11. The method of claim 10, wherein, the channel based in part on the user's demographic information is selected from the group comprising: an age related channel, a gender related channel, a geographic location related channel.

12. The method of claim 9, wherein at least one channel is generic with respect to the media input seed and the user's demographic information.

13. The method of claim 12, wherein, at least one channel is based in part on the user's demographic information selected from the group comprising: an age related channel, a gender related channel, a geographic location related channel.

14. The method of claim 12, wherein, the media input seed is selected from the group comprising: a song name, an artist name, an album name, a composer, and a genre.

15. The method of claim 1, wherein the combination score is calculated, the calculation comprising combining the respective media content object's channel specific score for each of at least two of the plurality of channels.

16. The method of claim 1, wherein the combination score is calculated, the calculation comprising combining the respective media content object's channel specific score for a majority of the plurality of channels.

17. The method of claim 1, wherein the selecting further comprises:
generating a playlist of media content objects based at least in part on their ranking;
selecting at least one media content object for transmission from the playlist.

18. The method of claim 17, wherein generating the playlist is additionally comprises:
determining from the plurality of channels two or more preferred channels;
determining a minimum percentage of media content objects to be obtained from each preferred channel; and
generating a playlist of media content objects from the preferred channels in accordance with their respective minimum percentages.

19. The method of claim 18, further comprising:
receiving a request to provide a media content object associated with the media input seed;
obtaining contextual information associated with the request; and
wherein the minimum percentage of media content objects to be obtained from a respective media content channel is determine at least in part based on the context information.

20. The method of claim 1, wherein at least one media content object of a first channel of the plurality of channels is not part of a second channel of the plurality of channels that is distinct from the first channel.

21. The method of claim 1, wherein the combination score for the respective media content object is based on the respective media content object's channel specific score for the at least one of the plurality of channels that is associated with the media input seed and the respective media content object's channel specific score for the at least one of the plurality of channels that is not associated with the media input seed.

22. The method of claim 1, wherein the at least one channel that is associated with the media input seed and the at least one channel that is not associated with the media input seed have a common media content object.

23. A server system, for selecting a media content object, comprising:
one or more processors; and
memory storing one or more programs to be executed by the one or more processors;
the one or more programs comprising instructions for:
receiving a media input seed associated with a user;
obtaining a plurality of channels of media content objects, wherein at least one of the plurality of channels is associated with the media input seed, at least one of the plurality of channels is not associated with the media input seed, and each respective media content object has a channel specific score;
calculating a combination score for a respective media content object based at least in part on the respective media content object's channel specific score for each of at least three of the plurality of channels, wherein the combination score for the respective media content object includes a weighted sum of the respective media content object's channel specific score for each of at least the three of the plurality of channels;
ranking at least some of the media content objects based at least in part on their respective combination scores; and
selecting at least one media content object for transmission based at least in part on the ranking.

24. A non-transitory computer readable storage medium storing one or more programs configured for execution by a server system, the one or more programs comprising instructions for:
receiving a media input seed associated with a user;
obtaining a plurality of channels of media content objects, wherein at least one of the plurality of channels is associated with the media input seed, at least one of the plurality of channels is not associated with the media input seed, and each respective media content object has a channel specific score;
calculating a combination score for a respective media content object based at least in part on the respective media content object's channel specific score for each of at least three of the plurality of channels, wherein the combination score for the respective media content object includes a weighted sum of the respective media content object's channel specific score for each of at least the three of the plurality of channels;
ranking at least some of the media content objects based at least in part on their respective combination scores; and
selecting at least one media content object for transmission based at least in part on the ranking.

* * * * *